July 14, 1942. V. V. GUNSOLLEY 2,290,043
EJECTOR FOR DOUGHNUT MACHINES
Filed March 13, 1939  2 Sheets-Sheet 1

Verne V. Gunsolley
Inventor
By Caswell & Lagaard
Attorneys

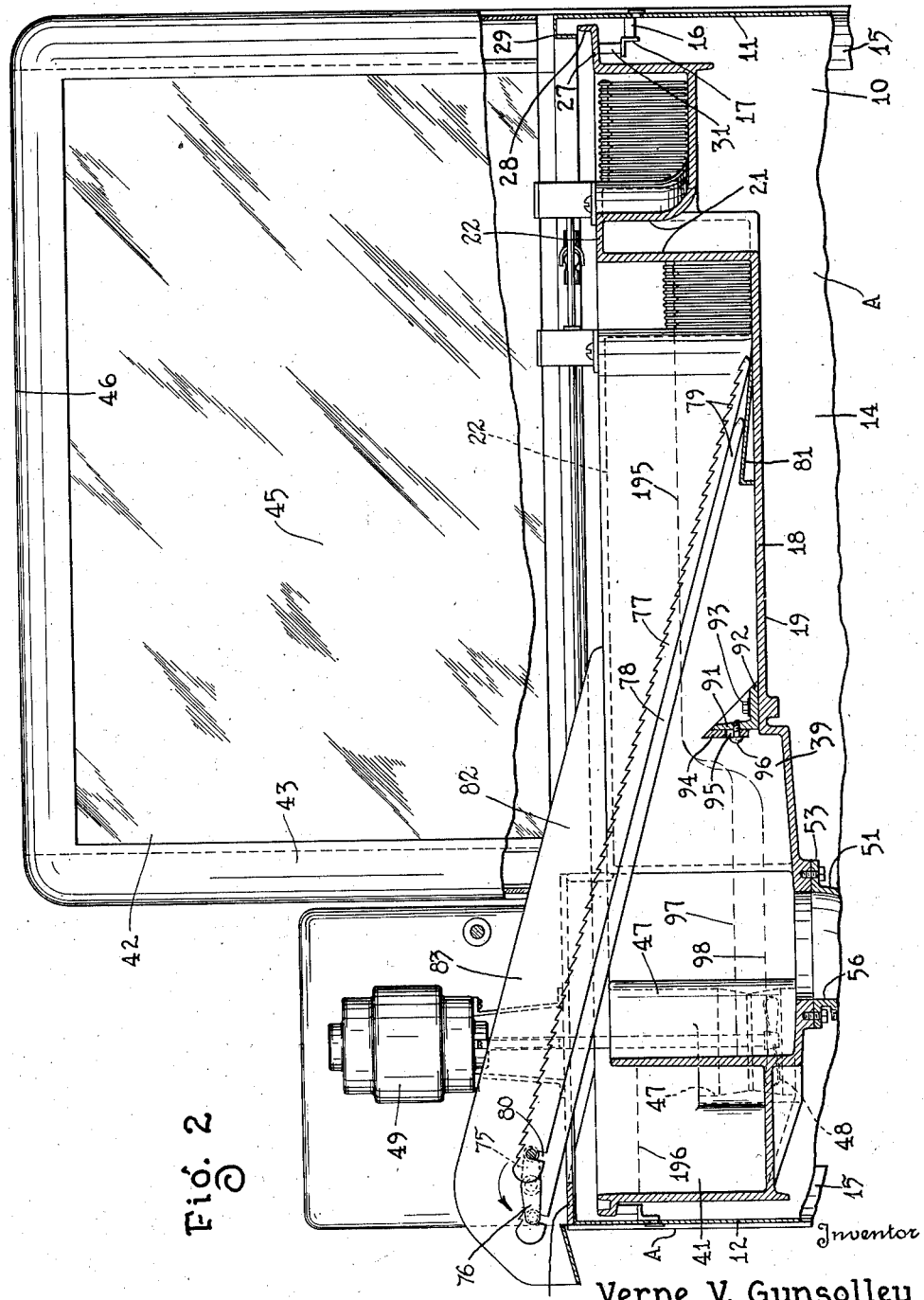

Patented July 14, 1942

2,290,043

UNITED STATES PATENT OFFICE 2,290,043

EJECTOR FOR DOUGHNUT MACHINES

Verne V. Gunsolley, Minneapolis, Minn., assignor to Dough-King, Inc., Minneapolis, Minn., a corporation of Minnesota Application March 13, 1939, Serial No. 261,450

12 Claims. (Cl. 53—7)

My invention relates to doughnut machines and particularly to doughnut machines in which the doughnuts are progressed along a channel in a kettle throughout a circuitous course by means of the flow of the cooking liquid.

An object of the invention resides in providing a doughnut machine which will be sanitary and easy to clean.

Another object of the invention resides in providing a doughnut machine in which the excess cooking liquid is removed from the doughnuts prior to the doughnuts being discharged from the machine.

Another object of the invention resides in providing an extremely simple and practical ejector for removing the doughnuts from the kettle.

A feature of the invention resides in constructing the machine so that the ejector may be easily and quickly removed therefrom to give access to the channel beneath the ejector.

Another object of the invention resides in constructing the ejector with a minimum number of moving parts.

A still further object of the invention resides in providing an ejector constructed with a number of blades supported on and operated by cranks and extending partly into and partly out of the cooking liquid.

Other objects of the invention reside in the novel combination and arrangements of parts and in the details of construction hereinafter illustrated and/or described.

In the drawings:

Fig. 2 is an elevational sectional view taken on line 2—2 of Fig. 1.

Figure 1:
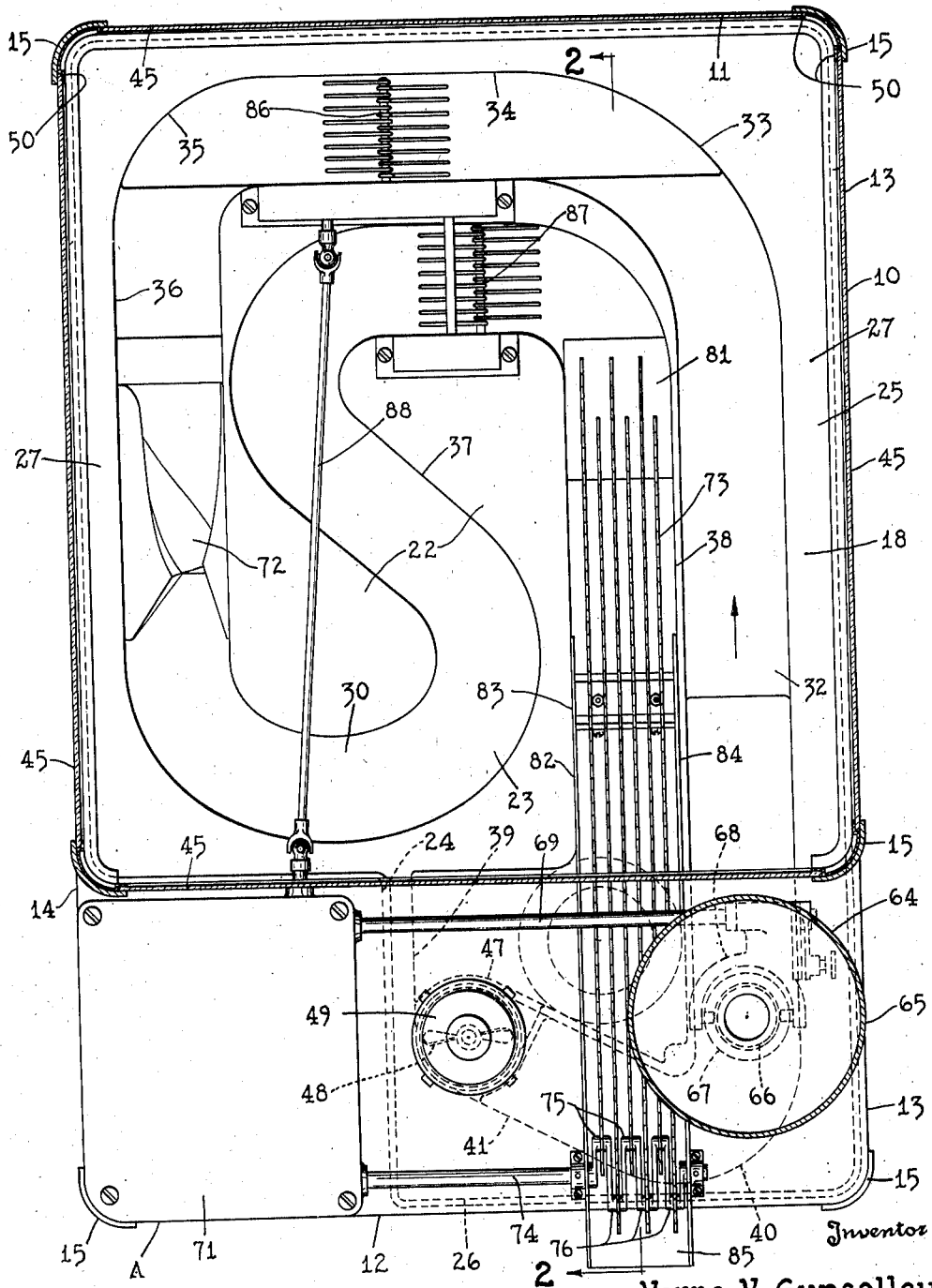
Fig. 1 is a plan sectional view of a doughnut machine illustrating an embodiment of my invention.

In the drawings I have shown a doughnut machine A which consists of a case 10 constructed with end walls 11 and 12 and side walls 13 and 14 connected therewith. The case includes uprights 15 disposed at the outer corners of the same which extend throughout the height of the case and to which the various walls are attached. Secured to the various uprights 15, by means of brackets 16, are angle frame members 17, which stiffen the case and which serve as supports for the kettle of the invention.

Within the case 10 is disposed a cooking kettle 18 which is preferably of cast material and which is constructed with a bottom 19 and with vertical walls 21 extending upwardly therefrom. The vertical walls are connected at their upper ends with upper walls 22 and the various walls are so arranged as to form a channel 23, which extends throughout the major portion of the kettle and which provides a way along which the doughnuts may travel. The kettle 18 has one corner of the same removed as designated at 24, leaving a main portion 25 of the width of the case 10 and of a length equal to about two-thirds of the length of the same. This construction also provides an extension 26 to the kettle which extends up to the end wall 12. The kettle 10 is constructed with a ledge 27 extending about the margin of the same, which terminates in a lip 28 projecting upwardly from the extreme edge thereof. A guard 29 on the case 10 issues inwardly from the walls thereof and overlies the lip 28, thereby protecting the same and at the same time being spaced therefrom to retard transmission of heat from the kettle to the case. The kettle 18 is supported on the angle frame members 17 through supporting blocks 31, which are situated at spaced intervals throughout the length thereof.

The channel 23 is arranged to provide a straight run 32 which commences in close proximity to wall 12 and follows along wall 13. The channel 23 at the end of run 32 makes a curve 33, which leads into another straight run 34 following along the wall 11. At the end of this run the channel has another curve 35 which leads into still another straight run 36, which follows along the wall 14. At the end of the run 36 the channel is constructed with a loop 30 which communicates with an S-shaped run 37. The latter run communicates with a straight run 38 which run is parallel with the run 32. The run 38 discharges into a reservoir 39, which is merely an enlargement of said run. From this reservoir a short run 41 is provided which forms part of a loop 40 connected to the beginning of the run 32.

The major portion 25 of kettle 18 is enclosed by means of a hood 42. This hood utilizes the uprights 15 at the end wall 11 and two other uprights 43 which are attached to the case 10 at the locality of the end of the major portion 25 of the kettle formed by the corner 24. Between these uprights are provided glass panels 45 which are slidably supported in guides 50 whereby the said panels may be removed. The entire hood is closed by a top 46 constructed of metal and attached to the uprights 15 and 43. The hood is so designed that the same encloses the runs 33, 34, 35, 36, 30 and 37 and the major portions of the runs 38 and 32, leaving part of the reservoir 39 and the loop 40 disposed outwardly of said hood.

In the reservoir 39 is provided a vertical tubular duct 47 which communicates at its lower end with the bottom of the reservoir 39. In this duct is disposed a propeller or elevator 48 which is mounted on the armature shaft of a motor 49. The duct 47 communicates at its upper end with the run 41 of the channel 23, thus discharging the cooking liquid from the reservoir 39 and into the run 41 of the channel, from which it flows throughout the course of the channel and is returned into reservoir 39.

At the lowermost portion of the reservoir 39 is arranged a clean out 51, which also serves as a sump for collecting crumbs and other solid material formed in the operation of the machine. This construction forming no particular feature of the invention has not been illustrated in detail.

Situated at the beginning of the run 32 of channel 23 is a doughnut former 64, which comprises a receptacle 65 for dough and a cutter 66 connected therewith. Such construction being well known in the art will not be described in detail in this application. The cutter 66 includes a flanged sleeve 67 which severs dough extrusions from the mass contained in receptacle 65. This sleeve is reciprocated in opposite directions by means of a forked arm 68, which is mounted on a shaft 69. Shaft 69 is operated by a motor and transmission enclosed within a transmission housing 71. Inasmuch as the driving mechanism for the shaft 69 does not form a feature of the instant invention, the same has not been illustrated. It will thus readily become apparent that doughnuts extruded from the doughnut former 64 are deposited in the flowing cooking liquid which travels along the run 32 of channel 23 in the direction of the arrow.

In the run 36 of channel 23 is arranged a twisted tubular turner 72. This turner inverts the doughnuts after the same have been cooked a predetermined length of time so that the said doughnuts may be cooked equally on both sides thereof.

The invention proper includes an ejector 73 which is disposed in the run 38 of channel 23. This ejector comprises a shaft 74 which is constantly driven from the transmission within the housing 71. This shaft has mounted on it oppositely extending cranks 75 and 76. Sets of toothed blades 77 and 78 are mounted on the said cranks and are adapted to be alternately raised and lowered as the shaft 74 rotates. For this purpose the said blades are provided with slots 80 which receive the cranks 75 and 76 and which permit of readily removing the blades therefrom. The lower ends 79 of these blades slide upon an inclined rest 81 which is mounted on the bottom 19 of the receptacle 18 in the portion of the run 38 leading from the S-shaped run 37. It will readily be comprehended that, as the doughnuts reach the said blades, the doughnuts are elevated and progressed upwardly and outwardly of the cooking kettle 18. The ejector 73 is disposed within a trough 82 constructed with two side plates 83 and 84 and a bottom 85 at the discharge end thereof, which directs the doughnuts upon leaving the ejector outwardly of the machine. At the same time the alternate striking of the doughnuts by the blades 77 and 78 causes the cooking liquid to be shaken from the same thus removing a greater portion of the cooking liquid than would be possible with the use of chain conveyors.

For controlling the rate of travel of the doughnuts along the channel 23 two controlling devices 86 and 87 are employed. These control devices operate to allow the doughnuts, one at a time, to enter the turner 72 and the ejector 73. These control devices are operated by a shaft 88 driven from the transmission within the housing 71 and are moved periodically at predetermined intervals. Inasmuch as any desired construction may be used for this purpose and since this construction does not form a particular feature of the instant invention, the details thereof have not been shown, nor will the same be described specifically. Where the machine is of fairly large capacity the control devices 86 and 87 may be omitted and the rate of flow of the cooking liquid utilized to time the cooking of the doughnuts.

For controlling the elevation of the cooking liquid in the channel 23 a dam 91 is used which extends across the run 38 of channel 23, at the locality of the beginning of the reservoir 39. The cooking liquid in flowing through the channel 23 passes over this dam, which serves as a weir and is maintained at a predetermined elevation thereby. The dam 91 consists of an angle member 92, which fits snugly between the walls of the run 38 and which is secured to the bottom 19 by means of cap screws 93. An adjustable weir 94, having slots 95 therein, is attached to the angle member 92 by means of screws 96. This weir may be raised and lowered to adjust the elevation of the cooking liquid and serves to produce the desired results. The elevation of the cooking liquid in the run 38 is designated by the reference numeral 195. The elevation of the cooking liquid in the run 32 and 41 is indicated by the reference numeral 196. The limits of the elevation of the cooking liquid in the reservoir 39 is indicated by the reference numerals 97 and 98. It will be noted that appreciable variation is possible, so that the machine may be run for an extended period of time in the intended manner without replenishing the cooking liquid consumed or lost.

The operation of the invention is obvious. The cooking liquid is brought up to the desired temperature by heating means, not shown in the drawings and so maintained throughout the use of the invention. Upon energizing motor 49, the cooking liquid is drawn from the reservoir 39 and discharged into the run 41 of channel 23. Where the speed of the motor or the capacity of the propeller 48 is variable the same are adjusted until the proper rate of flow of the cooking liquid is procured. When the desired rate of flow has been procured the weir 94 is adjusted until the elevation of the cooking liquid at the entrance of the turner 72 is proper. As the doughnuts travel through the machine the same are first cooked on one side, then turned by the turner 72 and cooked on the other side. As the completely cooked doughnuts are released by the control device 87 the same flow to the ejector 73. The blades 77 and 78 of this ejector then alternately engage the doughnuts, raising the same up and finally discharging them from the upper end of the ejector. As the doughnuts travel along the ejector they move up and down and the excess cooking liquid on the doughnuts is shaken off. The doughnuts, on reaching the end of the ejector, are thus free from excess cooking liquid.

The advantages of my invention are manifest. By means of the ejector used the slippage of the doughnuts along the same is prevented. As the doughnuts travel along the ejector the excess cooking liquid is removed therefrom. Due to the fact that the blades are constructed with slots, which hook over the crank pins, the blades may be instantly removed by raising the same upwardly and withdrawing them endwise from the machine. This gives immediate access to the interior of the channel below the ejector. Cleaning of both the parts of the ejector and the channel are thus easily and rapidly accomplished. With the ejector of my improved doughnut machine only six moving parts in addition to the cranks are employed thereby preventing an excess number of joints capable of collecting foreign matter.

Changes in the specific form of my invention, as herein disclosed, may be made within the scope of what is claimed without departing from the spirit of my invention.

Having described my invention, what I claim as new and desire to protect by Letters Patent is:

1. In a doughnut machine, a kettle having a channel along which the doughnuts are progressed through the flow of the cooking liquid and formed with a discharge run, a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades being pivoted at their upper ends to said cranks, and means for supporting and guiding the lower ends of said blades for movement, said blades striking the doughnuts from beneath and removing therefrom the excess cooking liquid on the doughnuts.

2. In a doughnut machine, a kettle having a channel along which the doughnuts are progressed through the flow of the cooking liquid and formed with a discharge run, a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades having slots therein at their upper ends adapted to engage said cranks for detachably securing said blades thereto and means for supporting and guiding the lower ends of said blades for movement, said blades striking the doughnuts from beneath and removing therefrom the excess cooking liquid on the doughnuts.

3. In a doughnut machine, a kettle having a channel along which the doughnuts are progressed through the flow of the cooking liquid and having a discharge run provided with side walls, a wall forming a continuation of one of said side walls and extending transversely of said run at the discharge end of the run, a shaft having its axis parallel with said last named wall and disposed at the discharge end of said run and at an elevation above the uppermost portion of said last named wall, said shaft having a plurality of cranks angularly disposed relative to one another and situated above said run, a plurality of blades within said run pivoted to said cranks and means for supporting and guiding the lower ends of said blades for movement, said blades striking the doughnuts from beneath and removing therefrom the excess cooking liquid on the doughnuts.

4. In a doughnut machine, a kettle having a channel along which the doughnuts are progressed through the flow of the cooking liquid and formed with a discharge run, a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades being pivoted at their upper ends to said cranks, a rest on which the lower ends of the blades are supported, said rest guiding the lower ends of the blades for movement, said blades striking the doughnuts from beneath and removing therefrom the excess cooking liquid on the doughnuts.

5. In a doughnut machine, a kettle having a channel along which the doughnuts are progressed through the flow of the cooking liquid and formed with a discharge run, a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades being pivoted at their upper ends to said cranks, an inclined rest on which the lower ends of the blades are supported, said rest guiding the lower ends of the blades for movement, said blades striking the doughnuts from beneath and removing therefrom the excess cooking liquid on the doughnuts.

6. In a doughnut machine, a kettle having a channel along which the doughnuts are progressed through the flow of the cooking liquid and formed with a discharge run, a shaft at the discharge end of said discharge run having a plurality of cranks, alternate cranks being angularly disposed 180 degrees from the adjacent cranks, a plurality of blades within said discharge run, said blades being disposed at an angle with respect to the surface of the cooking liquid and extending partly beneath and partly above the surface of the cooking liquid, said blades being pivoted at their upper ends to said cranks, and means for supporting and guiding the lower ends of said blades for movement, said blades striking the doughnuts from beneath and removing therefrom the excess cooking liquid on the doughnuts.

7. An ejector for doughnut machines including a kettle having a channel along which the doughnuts are progressed through the flow of the cooking liquid and formed with a discharge run, said ejector comprising a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades being pivoted at their upper ends to said cranks, and means for supporting and guiding the lower ends of said blades for movement.

8. An ejector for doughnut machines including a kettle having a channel along which the doughnuts are progressed through the flow of the cooking liquid and formed with a discharge run, said ejector comprising a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades having slots therein at their upper ends adapted to engage said cranks for detachably securing said blades thereto and means for supporting and guiding the lower ends of said blades for movement.

9. An ejector for doughnut machines including a kettle having a channel along which the doughnuts are progressed through the flow of the cooking liquid and formed with a discharge run, provided with side walls, said ejector comprising a wall forming a continuation of one of said side walls and extending transversely of said run at the discharge end of the run, a shaft having its axis parallel with said last named wall and disposed at the discharge end of said run and at an elevation above the uppermost portion of said last named wall, said shaft having a plurality of cranks angularly disposed relative to one another and situated above said wall, a plurality of blades within said run pivoted to said cranks, and means for supporting and guiding the lower ends of said blades for movement.

10. An ejector for doughnut machines including a kettle having a channel along which the doughnuts are progressed through the flow of the cooking liquid and formed with a discharge run, said ejector comprising a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades being pivoted at their upper ends to said cranks, a rest on which the lower ends of the blades are supported, said rest guiding the lower ends of the blades for movement.

11. An ejector for doughnut machines including a kettle having a channel along which the doughnuts are progressed through the flow of the cooking liquid and formed with a discharge run, said ejector comprising a shaft at the discharge end of said discharge run having a plurality of cranks, said cranks being angularly disposed relative to each other, a plurality of blades within said discharge run, said blades being disposed at an angle with respect to the surface of the cooking liquid and extending partly beneath and partly above the surface of the cooking liquid, said blades being pivoted at their upper ends to said cranks, an inclined rest on which the lower ends of the blades are supported, said rest guiding the lower ends of the blades for movement.

12. An ejector for doughnut machines including a kettle having a channel along which the doughnuts are progressed through the flow of the cooking liquid and formed with a discharge run, said ejector comprising a shaft at the discharge end of said discharge run having a plurality of cranks, alternate cranks being angularly disposed 180 degrees from the adjacent cranks, a plurality of blades within said discharge run, said blades being disposed at an angle with respect to the surface of the cooking liquid and extending partly beneath and partly above the surface of the cooking liquid, said blades being pivoted at their upper ends to said cranks, and means for supporting and guiding the lower ends of said blades for movement.

VERNE V. GUNSOLLEY.